Feb. 24, 1931.     S. G. DOWN     1,793,597
RESERVOIR LEAKAGE PREVENTING DEVICE
Filed June 28, 1927
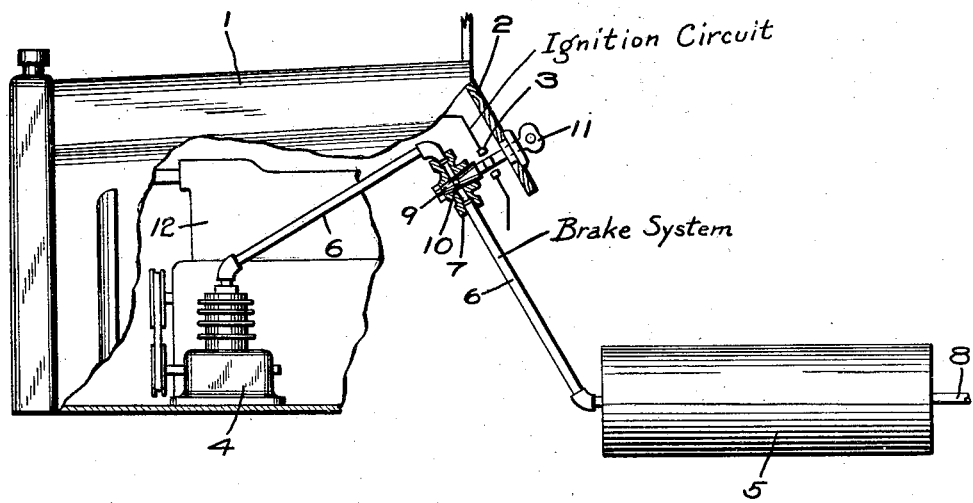
INVENTOR
SIDNEY G. DOWN
BY
ATTORNEY Patented Feb. 24, 1931

1,793,597

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

RESERVOIR-LEAKAGE-PREVENTING DEVICE

Application filed June 28, 1927. Serial No. 202,075.

This invention relates to automotive vehicles and more particularly to those equipped with fluid pressure systems.

It has heretofore been proposed to equip an automotive vehicle with a compressed fluid system in which fluid under pressure is stored for use in operating the brakes and for other purposes. When a vehicle so equipped is standing idle, stored fluid under pressure is liable to leak away and consequently will not be available for use when desired.

One object of my invention is to provide means effective when the vehicle is idle, for preventing leakage of fluid under pressure from the fluid pressure system.

A more specific object of my invention is to provide an automotive vehicle with means, operable upon some manual act in stopping the vehicle, for isolating from the fluid pressure system, the part or parts which are liable to permit leakage of fluid under pressure, and also operable upon some manual act in starting the vehicle to connect the isolated part or parts to the fluid pressure system.

Other objects and advantages will appear in the following more detailed description of my invention.

In the accompanying drawing the single figure is a combined side elevational and sectional view of a portion of an automotive vehicle having my invention embodied therein, a portion of the ignition circuit being illustrated diagrammatically.

Referring now in detail to the drawing, the reference character 1 indicates an automotive vehicle which may be of any desired construction and may comprise an instrument board 2 on which an ignition switch 3 is preferably mounted.

On any suitable part of the vehicle there is mounted a fluid compressor 4 which is adapted to be driven by the propeller engine 12 and is adapted to communicate with a fluid pressure reservoir 5, through pipes 6 and a valve device 7, such reservoir being connected, by a pipe 8, with the other parts of the fluid pressure system (not shown).

The valve device 7 may be of any suitable construction and as shown in the drawing may comprise a casing having a valve 9 rotatably mounted therein, which is provided with a passage 10 through which fluid under pressure may flow from the compressor to the reservoir 5. The valve device is preferably mounted so that the outer end portion of the valve 9 is adjacent the ignition switch 3. In the present embodiment of the invention, an ignition lever or key 11, operatively mounted on the instrument board 2, is shown permanently connected with the valve 9 so that, as the lever or key is rotated, the valve will be rotated with it.

Assuming the propellor engine to be operating, the compressor 4 will be operated thereby to supply fluid under pressure to the reservoir 5 through the pipes 6 and valve device 7. When the operator desires to stop the engine from operating, he rotates the ignition lever or key 11, in an anti-clockwise direction, to the position as shown in the drawing, causing the ignition switch 3 to be operated to open the electrical ignition circuit, and at the same time causing the valve 9 to be rotated to its closed position, thus rendering the engine and compressor 4 inoperative and at the same time closing the communication between the compressor and the reservoir 5. By thus isolating the compressor 4 from the reservoir 5, fluid under pressure from the reservoir is not permitted to flow back to the compressor, thus eliminating the possibility of leakage of fluid under pressure through the compressor to the atmosphere.

When the operator desires to start the engine, he rotates the ignition lever or key 11, a predetermined degree, in a clockwise direction, causing the ignition switch 3 to be operated to close the electrical ignition circuit, and at the same time rotating the valve 9 so that the communication between the compressor 4 and the reservoir 5 is again established. Now, when the operator starts the engine, the compressor will again supply fluid under pressure to reservoir 5.

I do not wish my invention to be limited to the exact details shown and described, for I believe I am the first to provide an automotive vehicle with means whereby a manual act of stopping the vehicle engine will cause a part or parts of the fluid pressure system to be isolated from other parts of the system and whereby a manual act of starting the vehicle engine causes the isolated part or parts to be again introduced into the system.

Having now described my invention, what I claim as new and desire to secure by Letters Patent, is:—

1. In an automotive vehicle, the combination with an electrical ignition circuit, of a switch device operable for controlling said circuit, a fluid pressure brake system comprising a reservoir, a fluid compressor, and a valve device interposed between said reservoir and compressor adapted to be operated with said switch device for controlling a communication between said reservoir and compressor.

2. In an automotive vehicle having a propeller engine, the combination with an electrical ignition circuit, of a switch device for opening said circuit to render said engine inoperative and for closing said circuit preparatory to starting said engine, a fluid pressure brake system comprising a reservoir, a fluid compressor adapted to be operated to supply fluid under pressure to said reservoir, and means operable with said switch device upon the opening of said circuit for isolating said compressor from said reservoir and operable with said switch device upon the closing of said circuit for establishing communication between said compressor and reservoir.

3. In an automotive vehicle having a propeller engine, the combination with an electrical ignition circuit, of a switch device for opening said circuit to render said engine inoperative and for closing said circuit preparatory to starting said engine, a fluid pressure brake system comprising a reservoir, a fluid compressor adapted to be operated by said engine to supply fluid under pressure to said reservoir, and means operable with said switch device upon the opening of said circuit for isolating said compressor from said reservoir and operable with said switch device upon the closing of said circuit for establishing communication between said compressor and reservoir.

4. In an automotive vehicle having a propeller engine, the combination with an electrical ignition circuit, of a manually operable switch for opening said circuit to render said engine inoperative and for closing said circuit preparatory to starting said engine, a fluid pressure brake system comprising a reservoir, a fluid compressor adapted to be operated to supply fluid under pressure to said reservoir, and means operable with said switch upon the opening of said circuit for isolating said compressor from said reservoir and operable with said switch upon the closing of said circuit for establishing communication between said compressor and reservoir.

In testimony whereof I have hereunto set my hand.

SIDNEY G. DOWN.